March 21, 1933.　　　G. E. MERWIN ET AL　　　1,902,657

THREAD CUTTING ATTACHMENT FOR LATHES

Filed Nov. 23, 1931　　　3 Sheets-Sheet 1

George E. Merwin and
Frank W. Shoemaker, INVENTORS

BY Victor J. Evans
and Co. ATTORNEY

March 21, 1933.     G. E. MERWIN, ET AL     1,902,657
THREAD CUTTING ATTACHMENT FOR LATHES
Filed Nov. 23, 1931     3 Sheets-Sheet 2
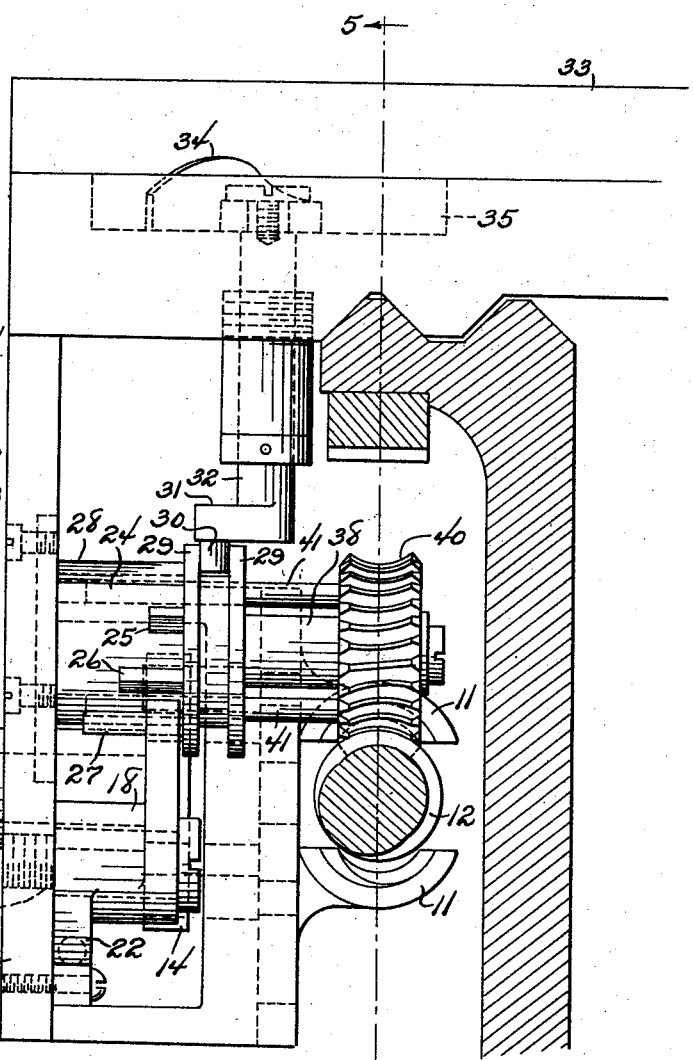
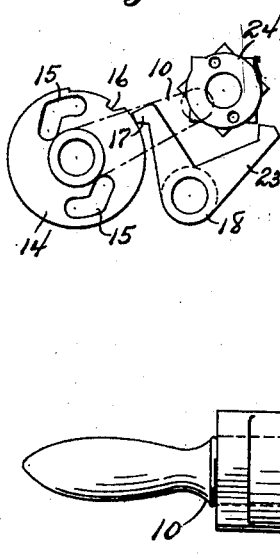
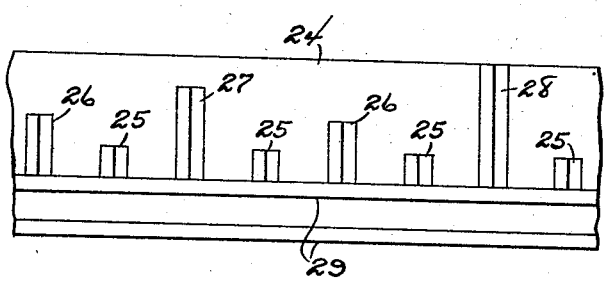
George E. Merwin and
Frank W. Shoemaker
INVENTORS
BY Victor J. Evans
and Co. ATTORNEY March 21, 1933.                G. E. MERWIN ET AL                1,902,657
                       THREAD CUTTING ATTACHMENT FOR LATHES
                          Filed Nov. 23, 1931        3 Sheets-Sheet 3
Fig. 4.
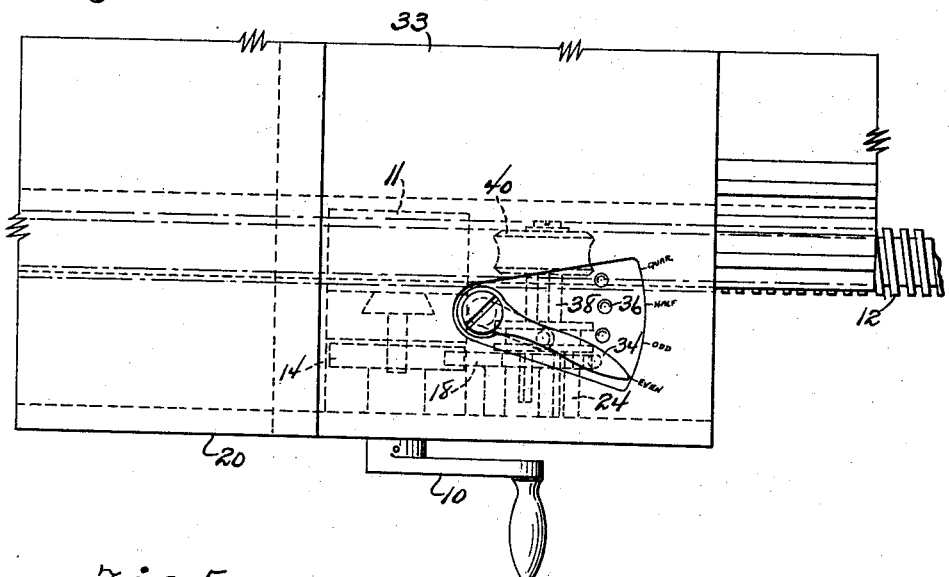
Fig. 5.
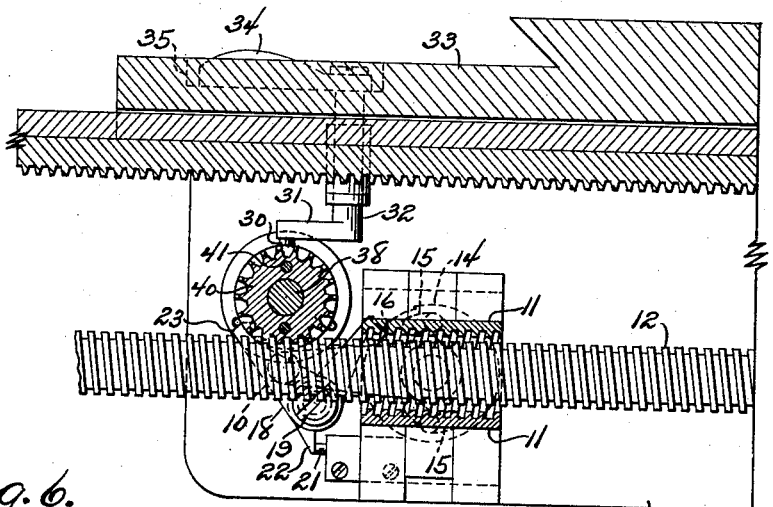
Fig. 6.
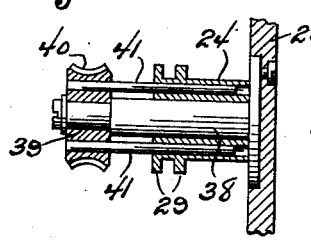
Fig. 7.
George E. Merwin and
Frank W. Shoemaker
INVENTORS
BY Victor J. Evans
and Co. ATTORNEY Patented Mar. 21, 1933

1,902,657

UNITED STATES PATENT OFFICE

GEORGE E. MERWIN AND FRANK W. SHOEMAKER, OF PORT ARTHUR, TEXAS

THREAD CUTTING ATTACHMENT FOR LATHES

Application filed November 23, 1931. Serial No. 576,929.

The object of the invention is to provide a device for inclusion as an element of a lathe carriage and cooperatively related with the lead screw so that the half nuts may be disengaged in the thread cutting operation and the carriage returned by hand with the half nuts positively retained in disengaged position until the half nuts are so positioned with respect to the lead screw that the threading tool may not be thrown out of its proper relation with respect to the thread being cut; to provide a device equipped with means selectively positionable to permit engagement of the half nuts at the proper time for fractional threads as well as for odd and even threads; and to provide a device of the kind indicated which is generally of simple form and susceptible of cheap manufacture and incorporation in the conventional lathe without material modification thereof.

With this object in view, the invention consists in a construction and combination of parts of which a preferred embodiment is illustrated in the accompanying drawings, wherein:

Figure 3 is an end elevational view of the carriage with the invention applied thereon, the lathe bed being shown in section.

Figure 4 is a top plan view of the structure of Figure 1.

Figure 5 is a sectional view on the plane indicated by the line 5—5 of Figure 3.

Figure 6 is a sectional view on the plane indicated by the line 6—6 of Figure 1.

Figure 7 is an end view of the cam barrel.

Figure 8 is a view of the peripheral surface of the structure of Figure 7 laid out in plan view.

Figure 9 is an elevational view of the cam barrel and half nut actuating disk and associated latch.

Figure 1:
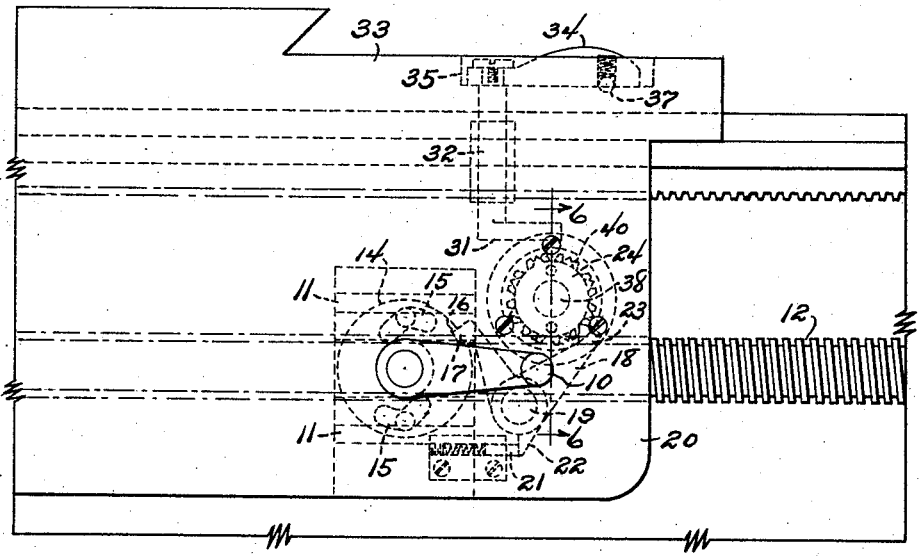
Figure 1 is a front elevational view of a portion of the lathe bed and carriage, showing the invention applied in operative position with the half nuts disengaged.
Figure 2:
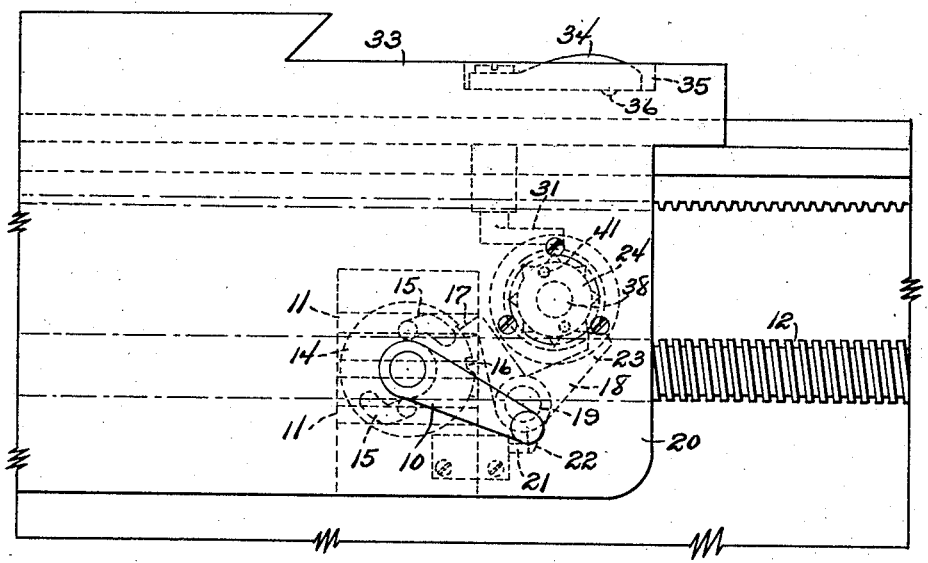
Figure 2 is a view similar to Figure 1 but showing the position of the parts when the half nuts are engaged.

When the invention is incorporated in a lathe structure, it serves as a positive means to retain in neutral position the handle or crank 10 by which the half nuts 11 are engaged with the lead screw 12. The crank handle 10 is mounted in common with slotted disk 14 by means of whose cam slots 15 the half nuts are moved toward or away from each other, when the disk is turned, as by movement of the handle.

In the neutral position of the disk which is the position where the half nuts 11 are disengaged from the lead screw, the notch 16 is in position where it may be engaged by the nose 17 of a latch 18, the latter being pivoted, as at 19, on the apron 20 of the lathe carriage and being spring impelled to engage the nose 17 with the notch 16 by means of the spring-pressed plunger 21 engaging an abutment lug 22 on the bell crank lever.

The arm 23 of the bell crank lever is disposed adjacent the peripheral surface of the cam barrel 24 provided with the ribs 25, 26, 27 and 28, the first being four in number, the second two and the third and fourth one each. The ribs 25 are shortest in actual extent, the ribs 26 next, the rib 27 next and the rib 28 last, this rib extending the full length of the barrel which is formed with spaced flanges 29 defining a groove which is traversed by the wrist pin 30 of a crank 31 carried at the lower end of a shaft 32 which is vertically disposed and journalled in a hole in the lathe carriage 33. At the upper end of the shaft 32, there is carried an arm 34 movable in a segmental clearance space 35 which is formed with angularly-spaced depressions 36, which are engaged by a spring-pressed ball 37 mounted in the underside of the arm.

It is obvious, that shifting of the arm to engage the ball with one or the other of the depressions 36 will result in axial movement of the cam barrel 34, the latter being rotatably mounted on a stud shaft 38 secured to the rear face of the apron 20. There is also mounted on the shaft 38 but at the reduced inner end 39 of the latter, a worm wheel 40 which is in mesh with the lead screw 12. The worm wheel is of course precluded from axial movement on the said shaft 38 but the barrel 24 is not, although it is keyed against annular movement with respect to the worm gear by reason of the diametrically-disposed axial dowel pins 41 mounted in the latter and slidably engaging axial holes formed in the barrel on diametrically opposite sides of its bore.

Depending on the position of the barrel 24 axially of the shaft 38, the latch 18, if its nose be engaged in the notch 16, will remain in a position to prevent actuation of the half nuts to engage the lead screw. Thus, if the cam barrel be positioned by the actuation of the crank 31, to put the ribs 25 in the vertical plane of the bell crank lever, the extremity of the arm 23 of the latter will be engaged by all of the ribs, as the carriage is moved forward or backward by hand, since such movement will impart rotation to the barrel by means of the worm wheel, under such conditions, being rotated by the relative movement of the carriage and lead screw. When any of the ribs engage the arm 23 of the latch, the latter will be rocked to disengage the nose 17 from the seat or notch 16 and in this position, the crank 10 may be operated to close the half nuts on the lead screw. For example, if the lead screw has an even pitch of four threads to the inch, the carriage will be properly timed with respect to the thread being cut if, after disengagement of the half nuts, they be re-engaged every eighth of a revolution. Since the ribs are eight in number and uniformly spaced angularly, any one of them engaging the latch will release the half nut locks at the proper time, but only at the proper time since any intermediate position will leave the free end of the arm 23 of the latch in the space between the ribs, so that the latch will not be released from locking engagement with the half nut actuating means.

On the basis of the four pitch lead screw, odd threads necessitate that the half nuts be engaged every quarter revolution, therefore the arm 34 is actuated to shift the cam barrel axially so that only the ribs 26, 27 and 28 are in the path of the latch. For half threads further shifting of the cam barrel by means of the arm 34 will dispose only the ribs 27 and 28 in the path of the latch, so that the latter will be released only from half revolution. For quarter threads, further shifting of the cam barrel will leave only the rib 28 in engagement with the latch, so that the latching means will be released to permit engagement of the half nuts from full revolution.

The invention having been described, what is claimed as new and useful is:

1. In combination with the carriage and lead screw of a lathe, half nuts, means for engaging the half nuts with the lead screw and disengaging them therefrom, a latch for the last said means, a barrel provided with peripheral ribs constituting latch releasing elements which are of different lengths axially, means for shifting the barrel axially, and means for driving the barrel from the lead screw, said means comprising a worm wheel meshing with the lead screw and having dowel pins slidably engaged with said barrel.

2. In combination with the carriage and lead screw of a lathe, half nuts, means for engaging the half nuts with the lead screw and disengaging them therefrom, a latch for the last said means, a barrel provided with axially arranged uniformly-spaced ribs, a stud carried by the apron on which the barrel is rotatably mounted, a worm wheel in mesh with the lead screw and having a positive driving connection with the barrel, the ribs on the barrel being of different lengths, and means for shifting the barrel axially, the ribs constituting the latch releasing means.

3. In combination with the carriage and lead screw of a lathe, half nuts, means for engaging the half nuts with the lead screw and disengaging them therefrom, a latch for the last named means, a barrel provided with peripheral ribs constituting latch releasing elements which are of different lengths axially, means for driving the barrel from the lead screw, a lever disposed on top of the carriage, a shaft extending through the carriage and connected with said lever, and operative connections between the shaft and the barrel for imparting axial movement to the latter on angular or turning movement being imparted to the shaft through the swinging of said lever.

4. In combination with the carriage and lead screw of a lathe, half nuts, means for engaging the half nuts with the lead screw and disengaging them therefrom, a latch for the last named means, a barrel provided with peripheral ribs constituting latch releasing elements which are of different lengths axially, means for driving the barrel from the lead screw, a lever disposed on top of the carriage, a shaft extending through the carriage and connected with said lever, a crank carried at the lower end of the shaft, the barrel having spaced flanges, and a wrist pin carried by the crank disposed between said flanges to impart axial movement to the barrel upon swinging movement being imparted to said lever.

5. In combination with the carriage and lead screw of a lathe, half nuts, means for engaging the half nuts with the lead screw and disengaging them therefrom, a latch for the last named means, a barrel provided with peripheral ribs constituting latch releasing elements which are of different lengths axially, means for driving the barrel from the lead screw, a lever disposed on top of the carriage, a shaft extending through the carriage and connected with said lever, a crank carried at the lower end of the shaft, the barrel having spaced flanges, and a wrist pin carried by the crank disposed between said flanges to impart axial movement to the barrel upon swinging movement being imparted to said lever, the lever being disposed in a segmental clearance space in said carriage, the latter being formed with spaced seats to be engaged by a lever carried latching means in different positions of adjustment of the lever.

In testimony whereof we affix our signatures.

GEORGE E. MERWIN.
FRANK W. SHOEMAKER.